May 5, 1936.  G. FOGES  2,039,401
AUTOMATIC SEALING DEVICE
Filed Feb. 9, 1932
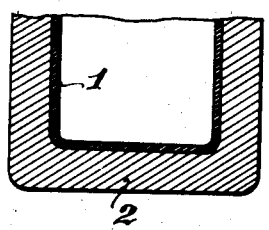
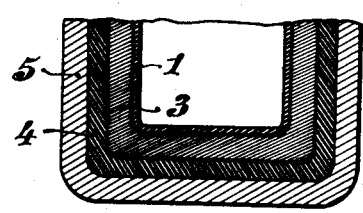
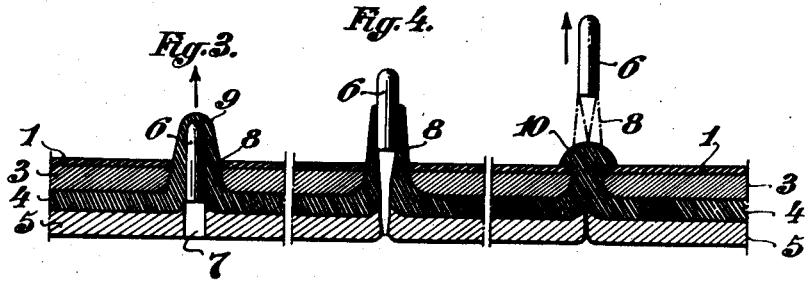
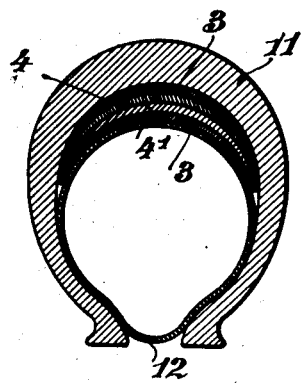
INVENTOR
GEORG FOGES
by Hermann F. Cuntz Patented May 5, 1936

2,039,401

UNITED STATES PATENT OFFICE 2,039,401

AUTOMATIC SEALING DEVICE

Georg Foges, Prague, Czechoslovakia

Application February 9, 1932, Serial No. 591,844
In Germany February 11, 1931

8 Claims. (Cl. 154—46)

This invention relates to closed, gas-filled or liquid-filled containers, in which injuries caused by reason of foreign bodies are sealed automatically. Arrangements of this nature may be used to advantage in those cases in which the container is liable to mechanical injury by the penetration of foreign bodies under pressure or impact, for instance as a means of protection against projectiles in the case of the fuel tanks of aircraft, or as an automataic sealing means in connection with pneumatic tires which may be damaged by glass, nails or the like.

Various means have already been devised heretofore for the same purpose, and it has been proposed to fill suitably shaped envelopes or hollow casings with a more or less viscous rubber substance, solution or composition, and to thus cover therewith the container wall. When the foreign body penetrating the wall of the container again escapes or is removed from the hole or perforation formed, the sealing substance, possibly under the action of any pressure which may prevail in the container, coagulates about the edges and thus gradually seals the puncture.

These arrangements are accompanied by the disadvantage that, more particularly in the case of relatively large punctures, an appreciable length of time necessarily elapses before the sealing operation or process has been completed, and that consequently a considerable proportion of the contents of the container, and also of the exuding sealing substance, runs to waste.

In consequence of this the sealing substance, in the case of repeated injuries, may not suffice to cope with requirements, while on the other hand, this substance, which is in liquid form, is liable to displacement within the envelope, and it may thus readily occur that those points of the container which are endangered to the greatest extent are left without protection.

When employing a more consisent filling material in place of the liquid substance it has been found that foreign bodies will work backwards and forwards in the composition and finally result in slits or elongated perforations of such extent that the sealing composition is incapable of fulfilling its intended object and the contents of the container are permitted to escape.

Finally, it has also been proposed for the automatic sealing of tires to employ fittings of falciform or falcate cross-section between the outer cover and the inner tube.

It is the object of the invention to overcome the disadvantages referred to, and to provide a self-sealing container which will remain closed even in the case of repeated and relatively extensive damage. In fulfillment of this object the invention is based on the adhesive properties of plastic substances, and resides substantially in the fact that as automatic sealing substance there are employed materials, the adhesion of which is, in relation to metals or other materials of which the foreign body may be composed, greater than in relation to the elastic casing or envelope containing the sealing substance or composition.

At the same time the plasticity of the sealing composition should be so great that the composition is not forced through the puncture or perforation towards the outside under the pressure of the contents of the container, or vice versa, into the interior of the container by reason of any surplus of pressure on the part of the surrounding atmosphere.

Furthermore, it has been found desirable, and this also constitutes part of the invention, to provide the sealing substance or composition with merely a low tensile strength which, however, must exceed the power of adhesion in relation to the foreign body. If now a foreign body penetrates the container, it will take with it parts of the sealing composition adhering thereto, which parts, however, expand and remain in cohesion with the filling proper. If the tension in the parts of the sealing substance exceeds a certain value owing to the fact that the foreign body moves away from the punctured elastic casing or envelope, these parts picked up by the foreign body will be caused to again leave the latter, their tensile strength being greater than the adhesion, and upon springing back will form a plug-like seal in the puncture or perforation.

In many cases it will be found desirable to fill the casing or envelope not only with a homogeneous substance, but to provide compositions of different adhesive power in two or more layers. In this case all of the layers may possess a greater power of adhesion in relation to the foreign body than in relation to the elastic casing or envelope, but the adhesion of at least one of the compositions in relation to the others should be equal to or greater than its adhesion in relation to the foreign body.

It is thus accomplished that upon the movement of the foreign body in the one direction the substance picked up thereby is retained upon its passage through the layer of greater adhesion, and thus again forms a plug-like closure, while upon the return movement of the foreign body the sealing of the puncture or perforation as described above will be effected on the opposite side of the casing or envelope.

The shaping of the protective layers may be performed in desired and convenient manner. The casing or envelope filled with the sealing substance may be fitted in the space formed between double walls of the container, tank, etc. Or alternatively, the device itself may constitute the wall of the container or be made integral therewith or united with the same to form one piece.

If the container is in the form of a pneumatic tire having the known fitting of falciform or falcate cross-section, the protective layers according to the invention operate as follows: Since foreign bodies which penetrate the tire are, in the majority of cases, again removed along the same path but in the opposite direction, an annular elastic envelope of falciform cross-section should be filled with two layers of plastic substance having different power of adhesion. Preferably, the layer situated towards the inner tube has a greater adhesive power, in relation to metal or other foreign bodies than the composition next to the outer cover possesses in relation to said foreign bodies. Both layers possess, as compared with the foreign body, greater power of adhesion than in relation to their envelope. The plasticity and tensile strength should conform with the requirements set forth above.

If now a nail or other foreign body penetrates the outer cover, the fitting and the inner tube, in the first place there remain adhering thereto on its passage through the part of the composition or substance adjacent the outer cover parts of this substance which, upon the additional passage through the second layer, are partly retained thereby. If the nail is then withdrawn in the opposite direction, the particles of substance adhering thereto and retained by the second layer are drawn away, whereby the same close the puncture or perforation on the inner side. The part of the nail which entered into contact with merely the layer of composition situated towards the outer cover, and also the portion of the nail which again enters into contact therewith upon the return movement, withdraw portions of the composition out of the envelope towards the outside, until these portions, as the tensile force increases, slide away from the nail and form a plug-like closure also on the side of the envelope situated towards the outer cover. Should all parts of the substance picked up from the first layer have been retained upon the passage through the second layer, the foreign body is now able to pick up parts of the second layer in the direction towards the tube, which parts, upon the return movement, are able to form a plug-like closure on the side directed towards the inner tube.

The arrangement will preferably be such that the sealing composition also possesses greater adhesive powers in relation to the tube than in relation to the material of the outer casing, for example by reason of the fact that the envelope is made of a vulcanized rubber material and the degree of vulcanization is measured accordingly.

Since the fitting is only able to prevent the escape of air if the same is intimately connected with the inner tube, i. e., is adapted to the dimensions thereof, it is desirable for the purpose of compensating inexactitudes as compared with the normal dimensions of the outer cover to make the clearance, which is necessary between the outer cover and the fitting, such that the outer diameter of the fitting is up to 5% smaller than the normal inner diameter of the outer cover. This is permissible because on the one hand the fitting is of an elastic nature, while on the other hand any increase in the size of the perforation or puncture by reason of this clearance is rendered ineffective by the plug. Similar conditions prevail if the fitting and the inner tube are made to constitute a unit, and this is also included in the scope of the invention.

The invention will now be described more fully with reference to the accompanying drawing, which illustrates a possible form of embodiment by way of example.

Fig. 1 shows in section a tank or container of the usual kind,

Fig. 2 being a sectional view of a tank of desired form according to the invention.

Figs. 3-5 illustrate the course of events when a foreign body penetrates the wall of the tank according to Fig. 2.

Fig. 6 shows the adaptation of the invention to a pneumatic tire.

In Fig. 1 the tank is constituted by the wall proper 1, and the protective casing 2 of raw rubber as heretofore usual.

In Fig. 2, however, the tank or container according to the invention comprises, for example, the wall 1 and a protective adhesive mass 4 situated between two layers 3 and 5, which are preferably composed of vulcanized rubber.

When the protected tank wall is penetrated by a foreign body 6 in the direction of the arrow (Figs. 3-5), this body will at first produce a hole 7 in the casing 5, which latter in itself has the tendency to contract and thus close the hole. Upon its further progress the foreign body will move in front of it a certain quantity 8—9 of the adhesive mass 4, pulling it through the layers 3 and 1.

In Fig. 4 the front end of the body 6 has passed through the part 9 (Fig. 3) of the adhesive substance 8 which it has carried with it on its way, and in Fig. 5 the tension of the parts 8 has reached such a level that these parts have moved away from the side of the body 6.

Owing to their elasticity, these parts, when leaving the body 6, spring back and settle in the manner of a plug having the head 10 in and over the perforation or puncture produced by the foreign body in the layer 3 and the wall 1.

In Fig. 6 the sealing substance or composition comprises two layers 4 and 4¹ embedded in an envelope 3 of vulcanized rubber, which envelope is inserted as a unit between the outer cover 11 and the inner tube 12 of a pneumatic tire.

Suitable self-sealing compositions for use with this invention may be produced, for example, by adding to hypermasticated dead-rolled rubber plasticizers in an unusually large amount, i. e., considerably more than approximately 5%. It has been found particularly suitable to employ for the purpose of addition mineral oils of relatively high fractions, such as spindle oil of higher than petroleum fractions, in amounts of approximately 18-35% dependent on the nature of the raw rubber employed. By reason of the hypermastication in conjunction with the addition of plasticizers there is also obtained the requisite low tensile strength.

As a material for the envelope it is possible to employ a vulcanized sheet of rubber. This offers in comparison with the layers of raw rubber hitherto employed for aircraft fuel tanks the additional advantage that the vulcanized rubber situated next to the tank will certainly swell on account of the gasoline, but will not be dissolved in the manner of raw rubber.

It will be understood that the invention is in no way restricted to the particular examples quoted, and may also be employed in the case of vessels and containers of desired form for manifold purposes. Various modifications are therefore possible within the meaning of the above description and the annexed claims without departing from the spirit of the invention.

What I claim as new and desire to secure by Letters Patent is:

1. An enveloped sealing mass for walls of enclosures of fluid media for automatically sealing punctures, perforations and the like caused by foreign bodies, said sealing mass comprising hypermasticated, dead rolled rubber and mineral oil plasticizers, and having a greater adhesive power with respect to the material of the foreign bodies, than with the enveloping material, and having tensile strength greater than the adhesive power to the materials of the foreign bodies.

2. A sealing mass for walls of enclosures of fluid media for automatically sealing punctures, perforations and the like caused by foreign bodies, comprising hypermasticated, dead rolled rubber and mineral oil plasticizers, in combination with an envelope of vulcanized rubber, said sealing mass having a greater adhesive power with respect to the material of the foreign bodies than with said enveloping vulcanized rubber, and having tensile strength greater than the adhesive power to the materials of the foreign bodies.

3. In a common envelope of vulcanized rubber, a plurality of layers of sealing mass for automatically sealing punctures, perforations and the like caused by foreign bodies in walls of enclosures of fluid media, said layers of sealing mass comprising hypermasticated, dead rolled rubber and mineral oil plasticizers, and having different but greater adhesive powers with respect to the materials of the foreign bodies than with respect to the material of the envelope, and tensile strengths greater than the adhesive powers to the materials of the foreign bodies.

4. A mass for automatically sealing punctures, perforations, and the like caused by foreign bodies in walls of enclosures of fluid media, comprising hypermasticated, dead rolled rubber and mineral oil plasticizers, like spindle oil, of higher than petroleum fractions in proportion of between 18 and 35 percent, in combination with an envelope of vulcanized rubber, said sealing mass having greater adhesive power with respect to the material of the foreign bodies than with respect to the vulcanized rubber of said envelopes, and having tensile strength greater than the adhesive power to the foreign bodies, whereby part of the sealing mass adheres to a foreign body entering it, and without parting from its connection with the remaining sealing mass, is drawn along by the foreign body when leaving beyond the envelope to an extent where it separates from the foreign body and forms a plug with a mushroom-like head in, respectively over, the puncture or perforation.

5. An automatically sealing mass for use in the walls of enclosures of fluid media, comprising hypermasticated, dead rolled rubber and considerably more than five percent mineral oils of higher than petroleum fractions.

6. An automatically sealing mass for use in the walls of enclosures of fluid media, comprising hypermasticated, dead rolled rubber and considerably more than five percent spindle oil of higher than petroleum fractions.

7. An automatically sealing mass for use in the walls of enclosures of fluid media, comprising hypermasticated, dead rolled rubber and between 18 and 35 percent mineral oil plasticizers.

8. An article of manufacture for use in the walls of enclosures of fluid media comprising an automatically sealing mass in an envelope of vulcanized rubber, said sealing mass comprising hypermasticated, dead rolled rubber and between 18 and 35 percent mineral oil plasticizers, such as spindle oil, of higher than petroleum fractions.

GEORG FOGES.